US007483060B2

(12) United States Patent
Miyata (10) Patent No.: US 7,483,060 B2
(45) Date of Patent: Jan. 27, 2009

(54) IMAGING APPARATUS, METHOD OF CREATING ALBUM FILES, AND A STORAGE MEDIUM THAT RECORDS METHOD OF CREATING ALBUM FILES

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 661 days.

(21) Appl. No.: 10/460,977

(22) Filed: Jun. 11, 2003

(65) Prior Publication Data

US 2003/0234875 A1    Dec. 25, 2003

(30) Foreign Application Priority Data

Jun. 19, 2002    (JP)    ............................. 2002-179029

(51) Int. Cl.
*H04N 5/225* (2006.01)
*H04N 5/76* (2006.01)
*H04N 5/222* (2006.01)

(52) U.S. Cl. ............ 348/231.2; 348/207.1; 348/333.05; 348/231.3; 348/231.6

(58) Field of Classification Search .............. 348/231.2, 348/207.99, 207.1, 207.11, 207.2, 333.01, 348/333.05, 333.11, 231.99–231.9
See application file for complete search history.

(56) References Cited

U.S. PATENT DOCUMENTS

| | | | | |
|---|---|---|---|---|
| 5,633,678 | A * | 5/1997 | Parulski et al. ............ 348/231.5 |
| 6,031,964 | A | 2/2000 | Anderson |
| 6,035,323 | A * | 3/2000 | Narayen et al. ............. 709/201 |
| 6,202,061 | B1 * | 3/2001 | Khosla et al. ................. 707/3 |
| 6,223,190 | B1 * | 4/2001 | Aihara et al. ................ 715/513 |
| 6,249,316 | B1 * | 6/2001 | Anderson ............. 348/333.05 |
| 6,567,122 | B1 * | 5/2003 | Anderson et al. ......... 348/211.3 |
| 6,571,271 | B1 * | 5/2003 | Savitzky et al. ............. 709/200 |
| 6,573,927 | B2 * | 6/2003 | Parulski et al. ................ 348/32 |
| 6,590,608 | B2 * | 7/2003 | Matsumoto et al. ...... 348/231.2 |
| 6,636,648 | B2 * | 10/2003 | Loui et al. ................... 382/284 |
| 6,738,075 | B1 * | 5/2004 | Torres et al. ................ 715/723 |

(Continued)

FOREIGN PATENT DOCUMENTS

EP    0 860 980 A2    8/1998

(Continued)

*Primary Examiner*—Tuan Ho
*Assistant Examiner*—Richard M Bemben
(74) *Attorney, Agent, or Firm*—Frishauf, Holtz, Goodman & Chick, P.C.

(57) ABSTRACT

HYML file is created to a user's own intention using reduced data amount to display a clear image After a process for selecting a photograph mode is performed (S101), it is judged whether an album mode has been set or not (S102). When the album mode has been set, a picture of a substance is taken in the album mode (S104) to obtain an image of the substance. When an instruction is entered to cease a photograph operation in the album mode (S105), HTML file is immediately created using only the image that is obtained and stored in a storage in the album mode (S107) upon instruction of creating HTML file immediately (S105; YES). When no instruction is given to immediately create HTML file (S105; NO), HTML file is created, at the time of power shutoff, using only the image that is obtained and stored in the storage in the album mode (S108).

3 Claims, 12 Drawing Sheets

U.S. PATENT DOCUMENTS

| | | | |
|---|---|---|---|
| 6,779,153 B1 * | 8/2004 | Kagle | 715/522 |
| 6,862,038 B1 * | 3/2005 | Anderson | 348/207.99 |
| 6,914,625 B1 * | 7/2005 | Anderson et al. | 348/222.1 |
| 6,937,275 B2 * | 8/2005 | Heiles | 348/231.2 |
| 6,965,410 B1 * | 11/2005 | Yamagishi | 348/362 |
| 2001/0028394 A1 | 10/2001 | Matsumoto et al. | |
| 2001/0048534 A1 | 12/2001 | Tanaka et al. | |
| 2002/0135685 A1 * | 9/2002 | Tsunoda | 348/231.2 |

FOREIGN PATENT DOCUMENTS

| | | |
|---|---|---|
| EP | 1 133 167 A1 | 9/2001 |
| JP | 2001-169222 A | 6/2001 |

\* cited by examiner

IMAGING APPARATUS, METHOD OF CREATING ALBUM FILES, AND A STORAGE MEDIUM THAT RECORDS METHOD OF CREATING ALBUM FILES

BACKGROUND OF INVENTION

The present invention relates to an imaging apparatus with a function of creating HTML files using images, a method of creating album files in the imaging apparatus, and a storage medium that records method of creating the album files.

An electronic camera has been introduced, which is provided with functions of taking a picture to generate an image, sorting the images into separate folders by uses, and recording the sorted images. Further, another electronic camera has been available, which has a function of creating HTML (Hyper Text Markup Language) files using images for displaying a list of all of the images.

In the conventional electronic camera having the function of creating HTML files, HTML files are created using previously photographed and retained images (a preview image, an original image or a photographed image), and images that are displayed in a list form in the HTML file are preview images and a chosen preview image is linked to an original photographed image, an enlarged view of which is displayed. Further in the conventional electronic camera, various types of HTML file (for instance, type 1 through type 4) are prepared for selection by a user to his or her liking, that is, some type of the HTML file is displayed on a menu screen to provide conditions for taking a picture, and other type is displayed for performing a slide show function. When the user selects a type of the HTML file, HTML file of the type selected by the user is created.

However, in the conventional electronic camera with the function of creating HTML files, when the function of creating HTML files is set, HTLM files are created from all of the images photographed by the user. Therefore, it is not allowed to create HTML files only for the images that the user chooses, and since HTLM file of all of the images will require a vast amount of memory, it will cause some trouble in storing or transmitting these files.

The extent that the user is allowed to reflect his or her intention to HTML file will be somewhat limited to selection of the type of HTML file, and the user is not allowed to create HTLM file to include an image to which his or her intention is reflected.

Further, the image to be linked with in HTLM file is the photographed image. Therefore, when thus created HTLM file is reviewed on a screen of a personal computer, if the photographed image includes a vast amount of data, such vast amount of data must be processed, requiring much time until the image appears on the screen. On the contrary, when a preview image is reviewed, only a little amount of data are processed, requiring not so much time till the preview image appears on the screen, but the image displayed on the screen is not so clear or sharp as the user wants, resulting in giving dissatisfaction to the user.

SUMMARY OF THE INVENTION

According to an aspect of the invention, there is provided an imaging apparatus which comprises a storage for storing image data of a subject, a file creating section for creating an album file using the image data stored in the storage, when an album mode is set, and a mode setting section for setting the file creating section to the album mode.

According to another aspect of the invention, there is provided an imaging apparatus with a display which comprises an imaging section for taking a picture of a subject to generate an image signal of the subject, a mode setting section for selectively setting one of plural photograph modes, a processing section for processing the image signal generated by the imaging section in accordance with the photograph mode set by the mode setting section to obtain image data; a storage for storing the image data obtained by the processing section, and an file creating section for creating an album file using the image data stored in the storage to display on the display the image data in a list form for each of the photograph modes.

According to still another aspect of the invention, there is provided an imaging apparatus with a display, which comprises an imaging section for taking a picture of a subject to generate an image signal of the subject, a mode setting section for selectively setting one of plural photograph modes, a processing section for processing the image signal generated by the imaging section in accordance with the photograph mode set by the mode setting section to obtain image data, a storage for storing image data obtained by the processing section; a condition setting section responsive to operation of a user for setting conditions for creating an album file from the image data stored in the storage, and a file creating section for creating the album file based on the conditions set by the condition setting section using the image data stored in the storage to display on the display the image data in a list form.

BREIF DESCRIPTION OF THE DRAWINGS

These and other objects, features, aspects and advantages of the present invention will become more apparent from the detailed description of the present invention when taken in conjunction with the accompanying drawings.

DESCRIPTION OF THE PREFERRED EMBODIMENTS

Embodiments of the present invention will be described hereinafter with reference to the drawings.

First Embodiment

Figure 1:
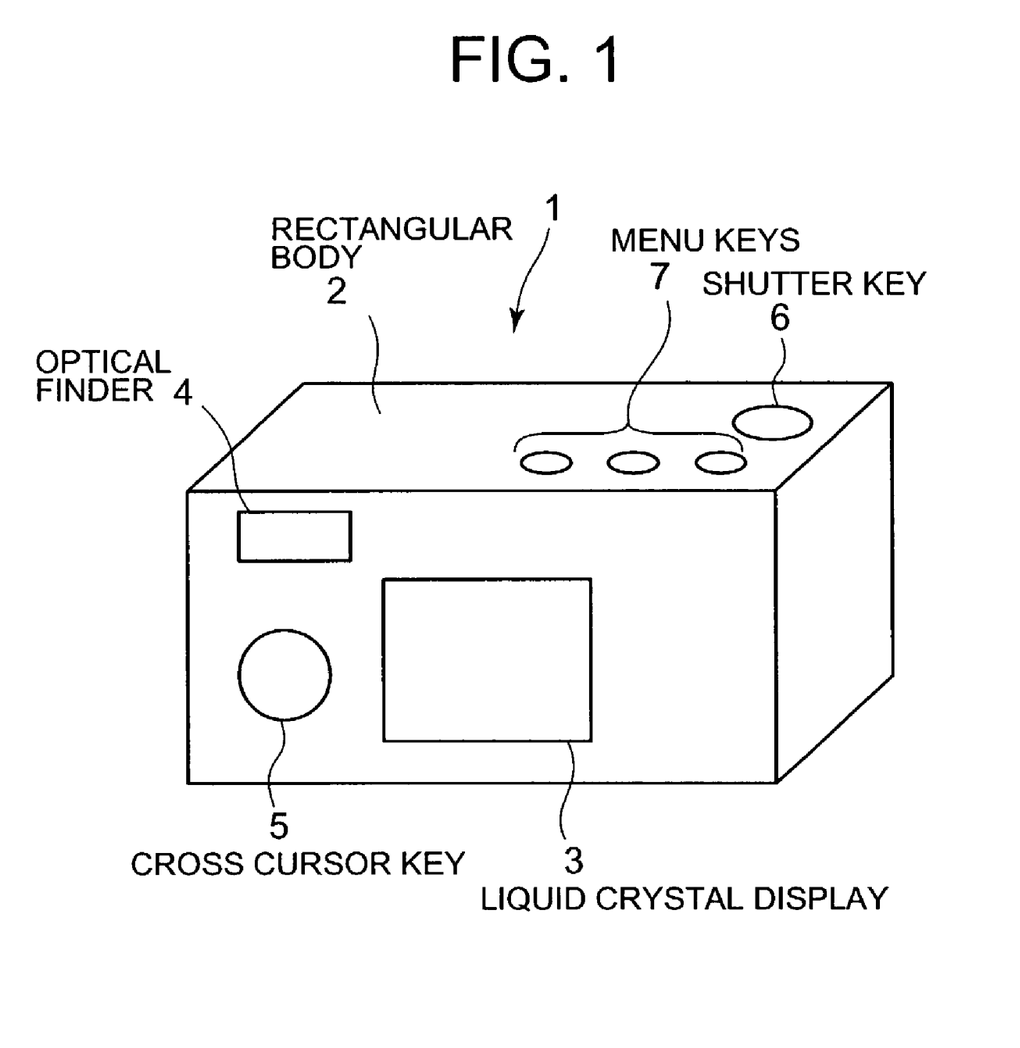
FIG. 1 is a perspective view of an external appearance of a digital camera according to embodiments of the present invention.

FIG. 1 is a perspective view of an external appearance of a digital camera 1 according to embodiments of the present invention. The digital camera 1 has a substantially rectangular parallelepiped body (camera body) 2. An optical lens 8 (not shown) is mounted on a front surface of the camera body 2, and a liquid crystal display 3, an optical finder 4 and a cross cursor key 5 are provided on a rear surface of the camera body 2. On a top surface of the camera body 2 are provided a shutter key 6 and various menu keys 7.

Figure 2:
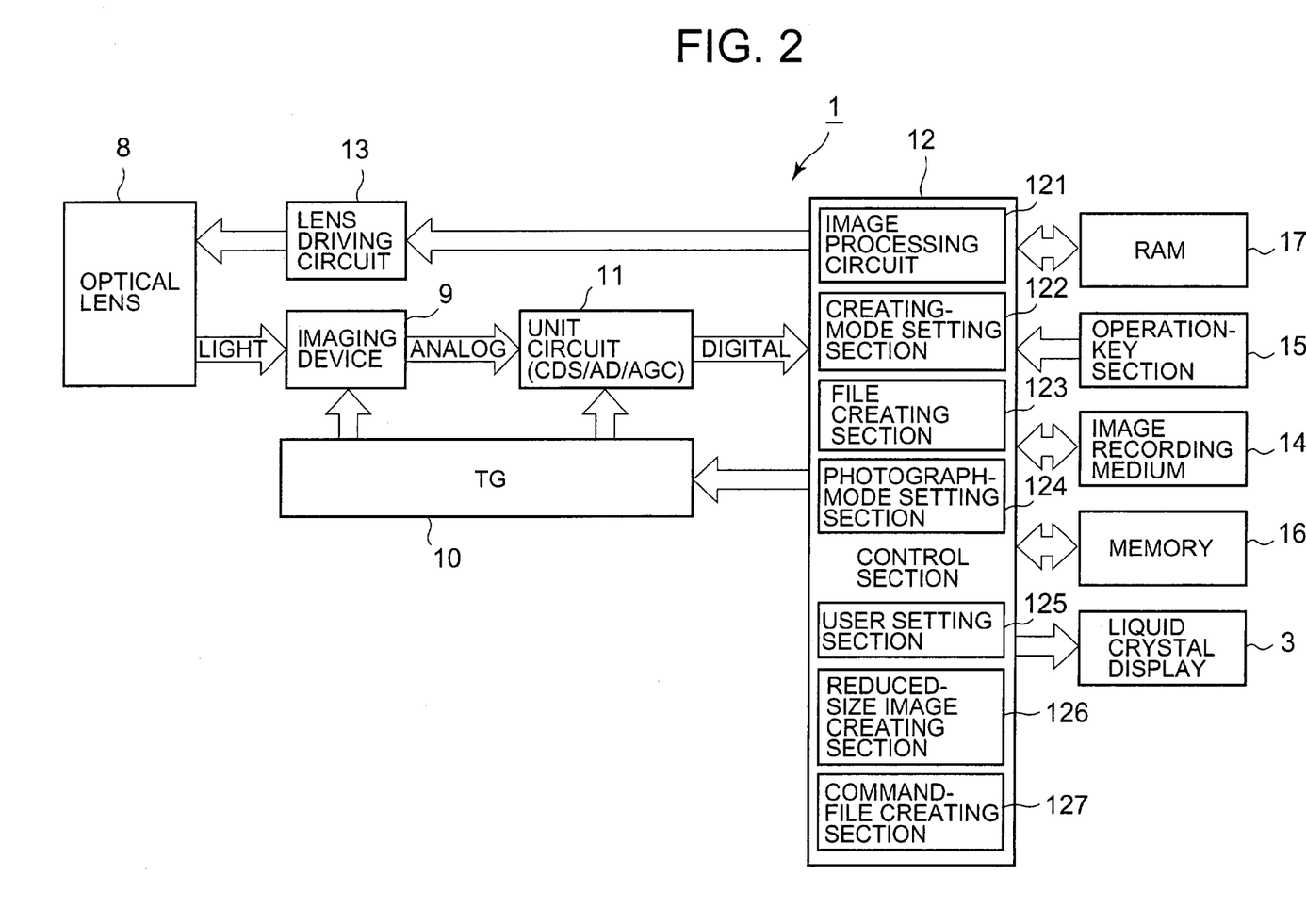
FIG. 2 is a circuit diagram of the digital camera according to the embodiments of the present invention.

FIG. 2 is a block diagram of an electronic circuit configuration of the digital camera 1 according to the embodiments. The digital camera 1 has the optical lens 8 mounted on the front surface of the camera body 2, an imaging device 9 on which an image of a subject is focused through the optical lens 8, a timing signal generator (TG) 10 for driving the imaging device 9, and a unit circuit 11. Further, the unit circuit 11 includes a Correlated Double Sampling circuit (CDS) for suppressing noises involved in an image signal output from the imaging device 9, an automatic gain control amplifier (AGC) for amplifying the image signal, and analog/digital converter (A/D) for converting the image signal into a digital signal. The image of the subject is focused on the imaging device 9 through the optical lens 8, and then the imaging device 9 generates the image signal of the subject. The image signal output from the imaging device 9 is sampled, amplified and digitized into the digital signal in the unit circuit 11, and further supplied to a control section 12, in which the digital signal is converted into a luminance signal by an image processing circuit 121, subjected to an integration process and a histogram process.

The optical lens 8 is supported by a lens driving mechanism including a lens driving circuit 13 and an automatic focusing motor (AF motor). The optical lens 8 is driven by the lens driving circuit 13 under control of the control section 12 to move along its optical axis for adjustment of focus of the subject image on the imaging device 9. When the digital camera 1 is set to an Auto Exposure mode (AE mode), the imaging device 9 is driven by TG 10 based on shutter pulses sent from the control section 12, whereby a charge storage time of the imaging device 9 is controlled, and an electronic shutter function is realized.

The control section 12 is provided to control operations of various sections of the digital camera 1, and has functions for processing a signal and an image in respective photograph modes set in the digital camera 1, such as a normal mode, a scenery mode, a portrait mode, a macro mode, and a panorama mode. The control section 12 generates a video signal based on the digital signal output from the unit circuit 11, and displays a through image of the subject photographed by the imaging device 9 on a liquid crystal display 3 including a. TFT liquid crystal display monitor.

In a photographing operation, the control section 12 compresses the image signal of the subject which has been subjected to the signal process and image process corresponding to the above modes to generate an image file in JPEG format and stores the image file on a detachable image recording medium (recording section) 14 comprising a flash memory and the like. In a reproducing operation, the compressed image file is read out from the recording section 14 and expanded to be displayed on the liquid crystal display 3. The control section 12 has various sections, including a creating-mode setting section 122 for setting a mode for creating an album file (HTML file), a file creating section 123 for creating a album file, a photograph-mode setting section 124 for selectively setting one of plural photograph modes, a user setting section 125 for reflecting user's intention to create an album file, a reduced-size image creating section 126 for creating a reduced-size image to be exclusively connected with the album file and a command-file creating section 127 for creating a command file to instruct a computer to automatically start up the album file.

Further, the control section 12 is connected with an operation-key section 15 including the cross cursor key 5, the shutter key 6, and the various menu keys 7, a memory 16, and RAM 17. The memory 16 is a program ROM on which operation program and other program and data are recorded. The operation program is necessary for the control section 12 to control various sections and to process data, and above other program and data are used for executing processes shown in the flow charts as set forth below. RAM 17 is used by the control section 12 for creating an HTML file.

Now, operation of the digital camera 1 with the structure as set forth above will be described with reference to the flow chart of FIG. 3. In the digital camera 1, the control section 12 runs the operation program to perform a photograph-mode selecting process at step S101 in the flow chart of FIG. 3. In the photograph-mode selecting process, on the liquid crystal display 3 are sequentially displayed a photograph-mode menu including indications such as the "normal mode", "scenery mode", "portrait mode", "macro mode", "panorama mode", and "album mode" in response to operation of the menu keys 7, and a photograph mode which is selected on the display section 3 by operation of the cross key 5 is set to the digital camera 1.

Then, it is judged at step S102 if the album mode has been set at step S101. When it is determined that the photograph mode other than the album mode has been set, a photographing operation is performed at step S103. In other words, the image signal is processed and compressed in response to operation of the shutter key 6 in accordance with the mode that has been set at step S101, whereby an image file in JPEG format is created and stored with a filename on the image storage medium 14.

When it is determined at step S101 that the album mode has been set, the photographing operation is performed in the album mode at step S104. Then, the image signal is processed and compressed in response to operation of the shutter key 6 in a similar manner to the normal mode, whereby an image file in JPEG format is created and stored with a filename on the image storage medium 14. When the photographing operation is finished in the album mode by user's manipulation of the menu keys at step S105, it is judged at step S106 if HTML file is immediately created.

When the user operates the menu keys 7 in a predetermined manner to enter an instruction to immediately create HTML file, then HTML file is immediately created using only the image file which has been stored on the image storage medium 14 at step S104 and the created HTML file is stored on the image storage medium 14 at step S107. When the menu keys 7 have not been operated to instruct to create HTML file immediately, HTML file is not created immediately but at the time of power shutdown, using only the image file which has been stored at step S104 on the image storage medium 14 and the HTML file created at the time of power shutdown is stored on the image storage medium 14 at step S108.

As set forth above, it is possible in the present embodiment to create HTML file of the image which is photographed only in the album mode that has been intentionally set by the user. In other words, HTML file of only such image as the user desires to include in HTML file is created in the first embodiment. The user can reflect his or her intention to the images to be included in HTML files, reducing an amount of data in a file and allowing easy treatment (store and transfer) of the files.

Second Embodiment

FIG. 4 through FIG. 12 are views for illustrating a second embodiment of the present invention. The process for selecting the photograph mode is executed at step S201 in the flow chart of FIG. 4, in a similar manner to the process at step S101 in the flow chart of FIG. 1. At step S202, it is judged if the album mode has been set. When the album mode is not set but a photograph mode other than the album mode is set, the photographing operation is performed in the photograph mode that has been set at step S203.

Figure 4:
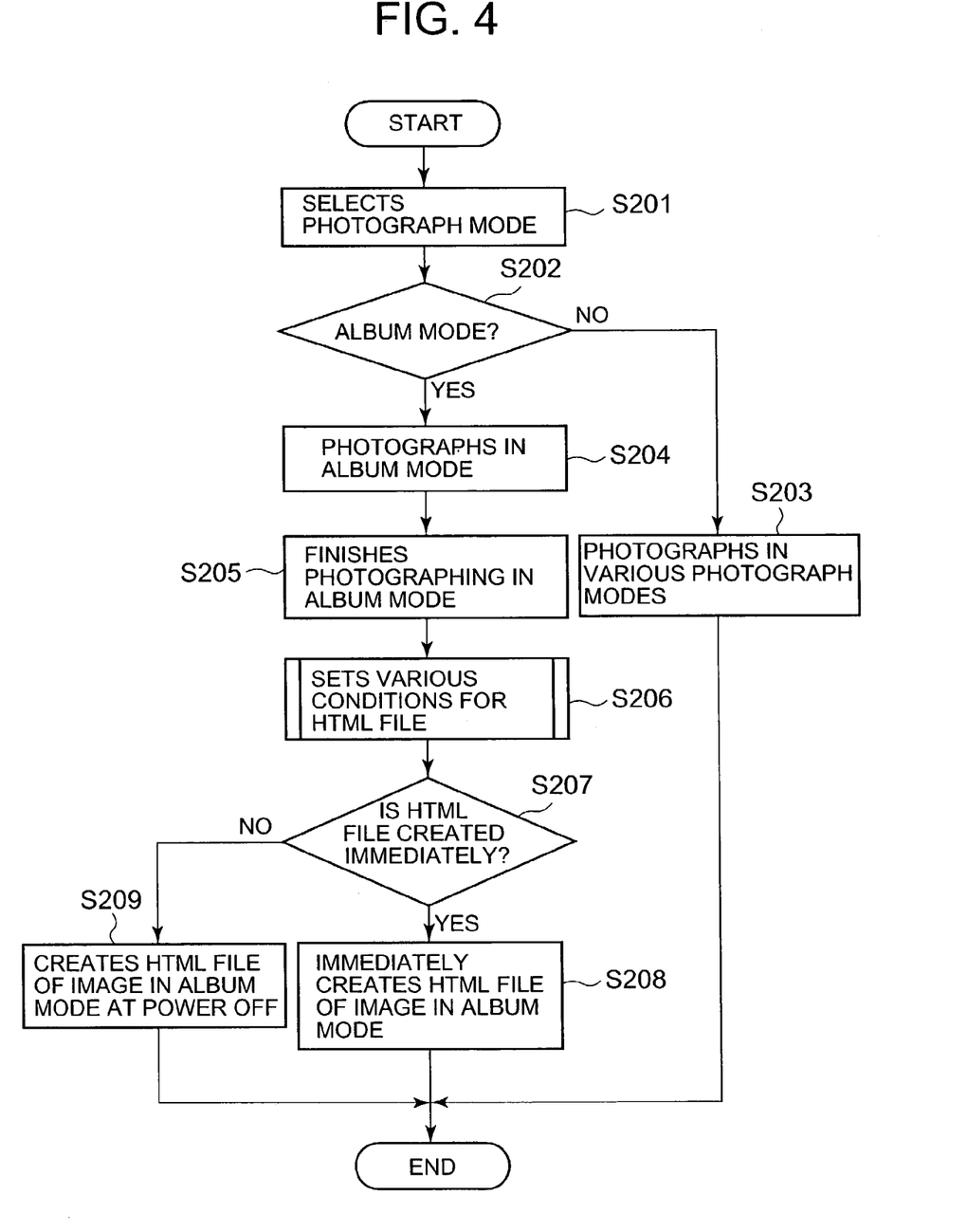
FIG. 4 is a flow chart of processes performed in a second embodiment of the present invention.

When it is determined at step S202 that the album mode has been set, the photographing operation is performed in the album mode to generate an image signal at step S204. The generated image signal is compressed to create an image file in JPEG format, and the created image file is stored on the image storage medium 14. The photographing operation is finished by certain operation of the menu keys in the album mode at step S205, various setting processes for HTML file are executed in sequence at step S206.

Figure 5:
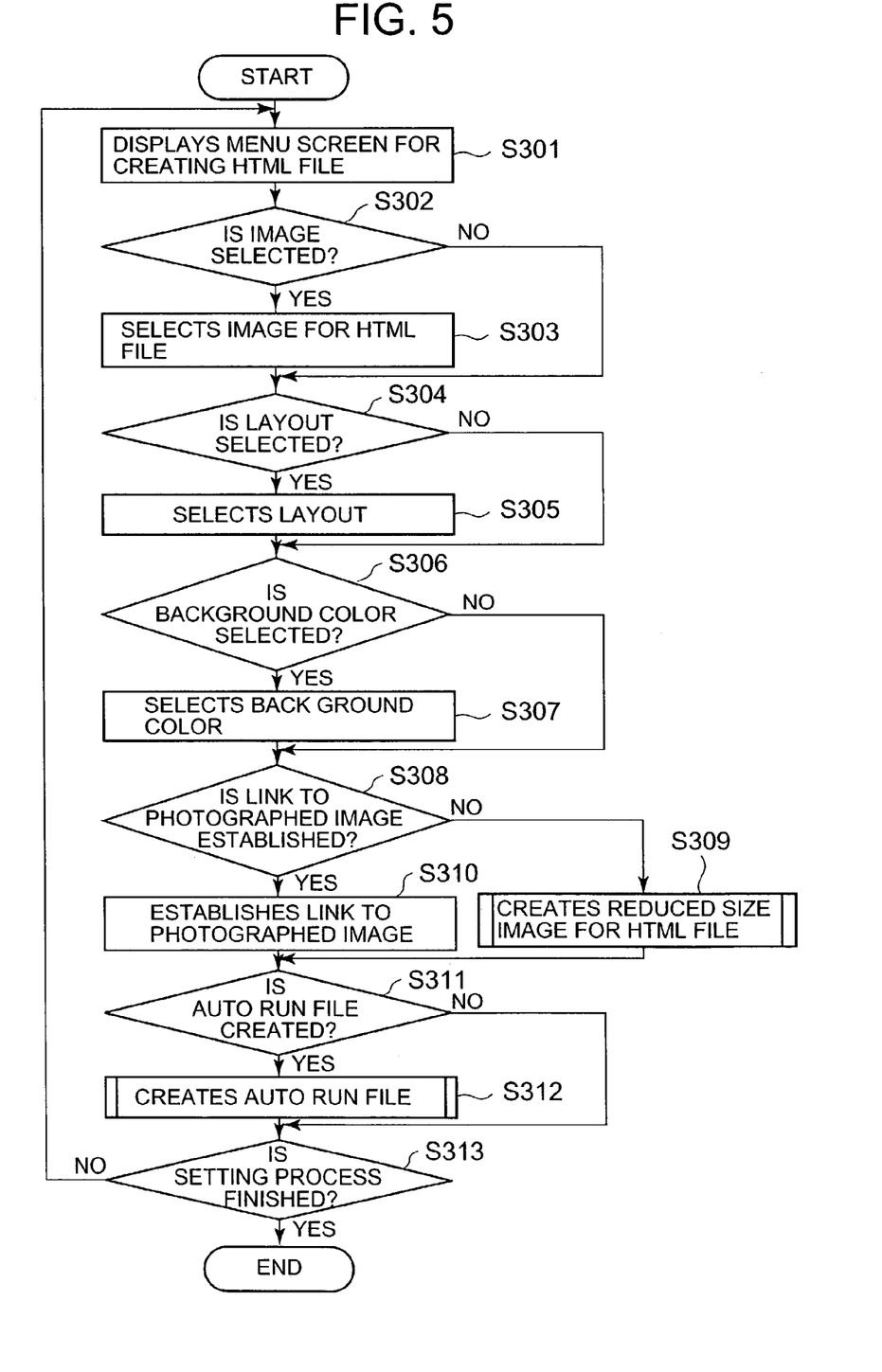
FIG. 5 is a flow chart showing details of a setting process for creating an HTML file.
Figure 6:
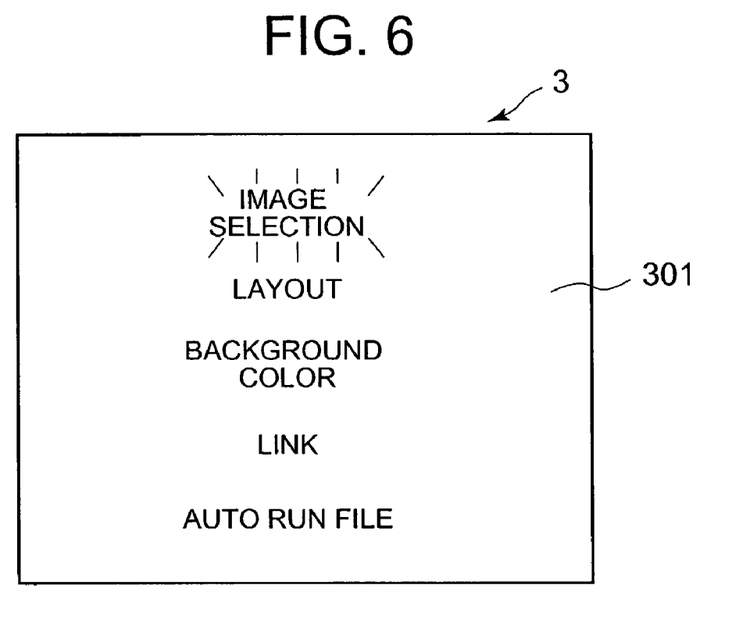
FIG. 6 is a view illustrating an example of a menu screen.

The setting processes for HTML file are performed in accordance with the flow chart of FIG. 5. At first, a menu screen for setting conditions to create HTML file is displayed on the liquid crystal display 3 at step S301. FIG. 6A is a view illustrating a sample of the menu screen 301 to be displayed on the liquid crystal display 3, which includes indications such as "IMAGE SELECTION", "LAYOUT", "BACKGROUND COLOR", "LINK" and "AUTO RUN FILE" displayed on the display 3 for selecting conditions. At step S302, it is judged if the indication of "IMAGE SELECTION" is selected. When the indication of "IMAGE SELECTION" is selected on the menu screen 301, a process is performed at step S303 for selecting an image which the user wants to include in HTML file.

Figure 3:
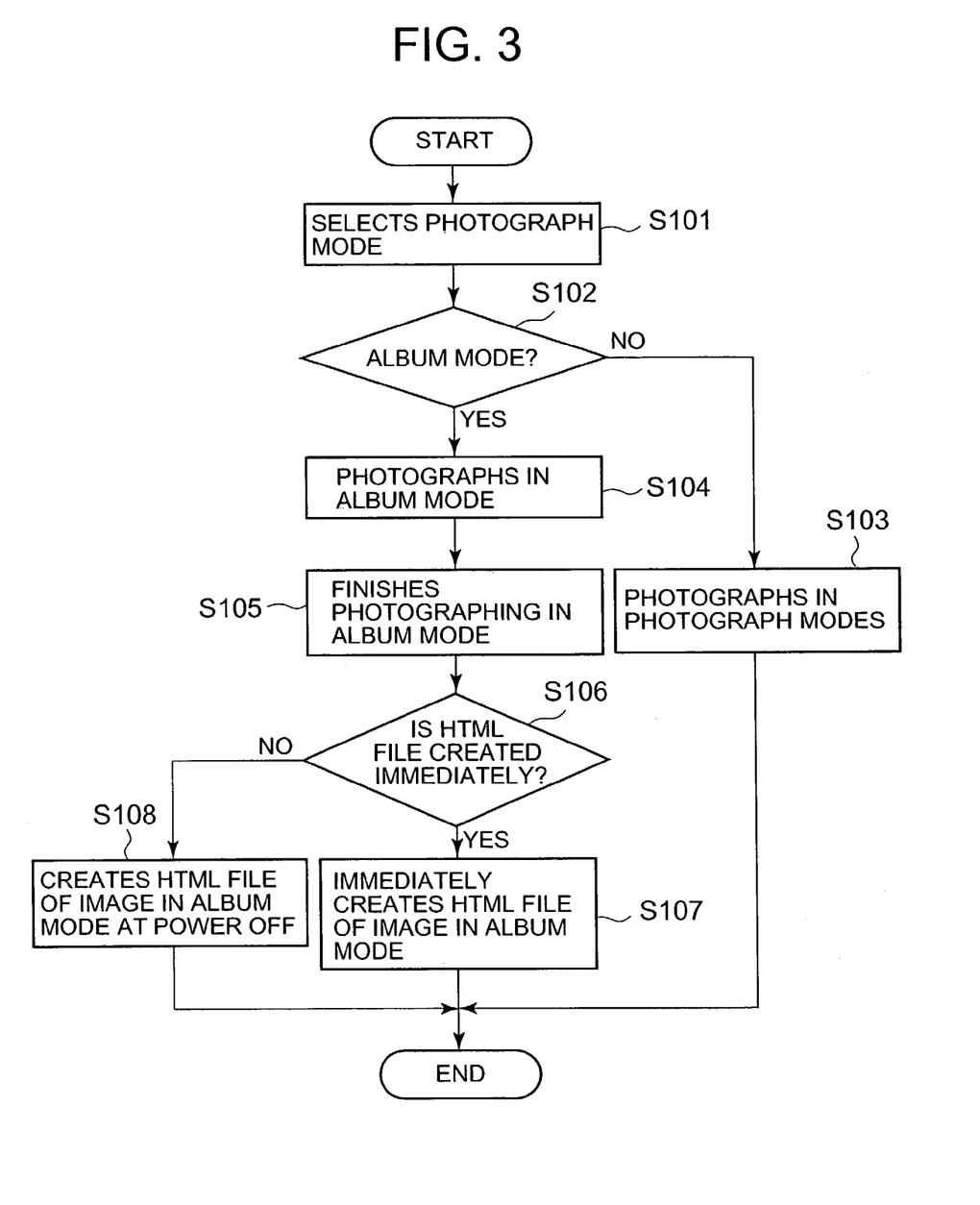
FIG. 3 is a flow chart of processes performed in a first embodiment of the present invention.
Figure 7:
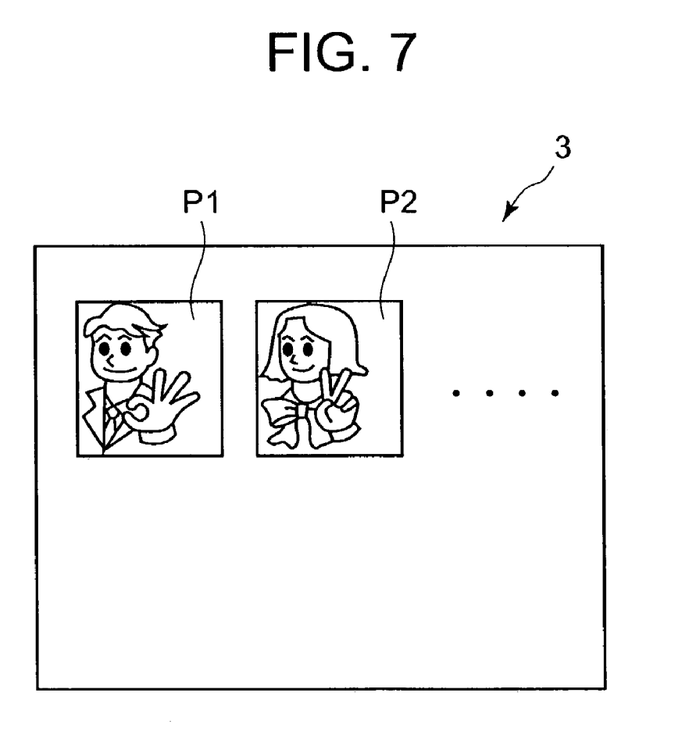
FIG. 7 is a view illustrating an example of an indication displayed on a screen in a process at step S303.

At the process of step S303 of FIG. 3, plural images P1, P2 ... are displayed in a reduced size on the liquid crystal display 3 as shown in FIG. 7, which plural images have been photographed in the album mode and stored in the image storage medium 14 at step 204. When several images are selected from among the images displayed in a reduced size on the display 3 by operation of the keys, file names of the selected images are stored on RAM 17.

Figure 8:
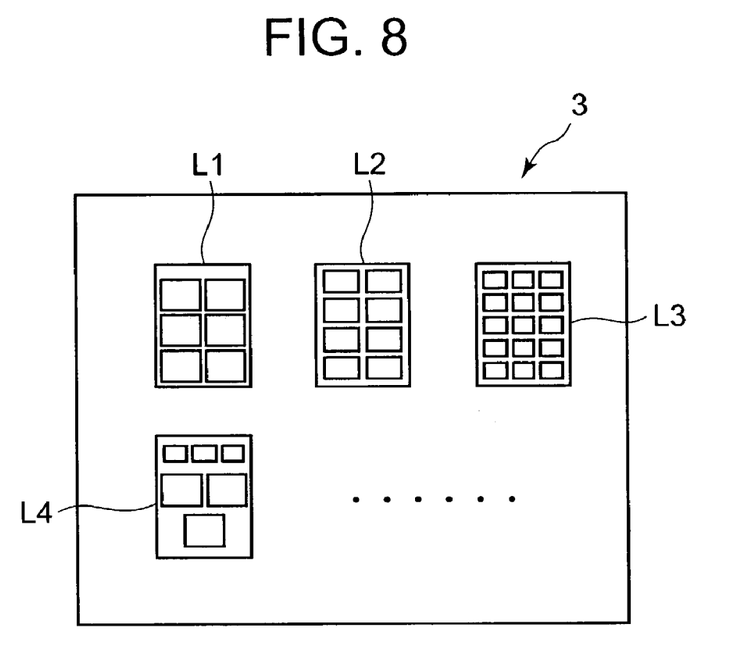
FIG. 8 is a view illustrating an example of an indication displayed on a screen in a process at step S305.

Then, the process advances to next step S304, where it is judged if the indication of "LAYOUT" is selected on the menu screen 301 displayed on the display 3. When the indication of "LAYOUT" is selected, a process for selecting a layout is performed at step S305. For performing the above selecting process at step S305, plural samples of layout patterns L1, L2, L3, L4 ... are displayed on the liquid crystal display 3, as shown in FIG. 8. When one of the layout patterns is chosen from among plural layout patterns L1, L2, L3, L4 . . . displayed on the liquid crystal display 3 by operation of the key, then the chosen layout pattern is stored on RAM 17.

Figure 9:
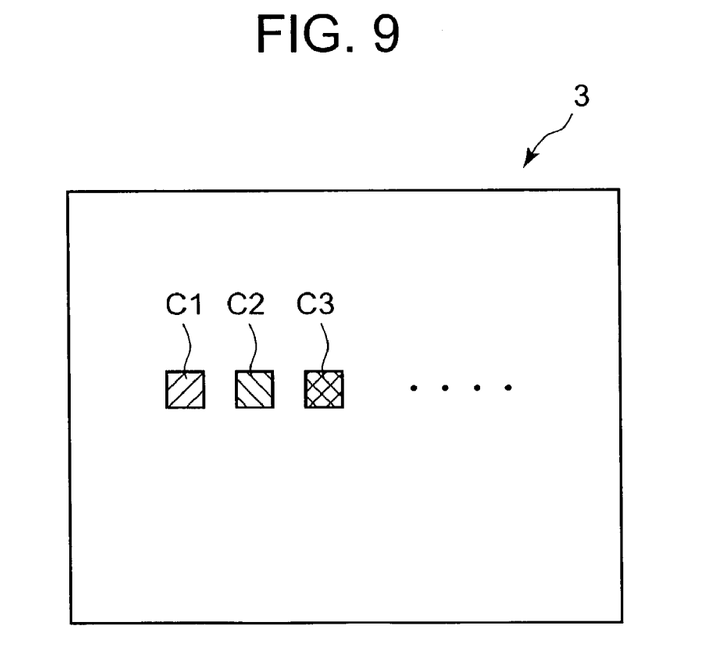
FIG. 9 is a view illustrating an example of an indication displayed on a screen in a process at step S307.

Further, the process advances to step S306, where it is judged if the indication of "BACKGROUND COLOR" is chosen on the menu screen 301. When the indication of "BACKGROUND COLOR" is chosen, a process for choosing a background color is performed at step S307. For performing the process for choosing the background color at step S308, plural color samples such as C1, C2, C3 . . . are displayed on the liquid crystal display 3, as shown in FIG. 9. When either background color is chosen from among plural background color samples C1, C2, C3, . . . displayed on the liquid crystal display 3 by operation of the key, then the chosen background color is stored on RAM 17.

Figure 10:
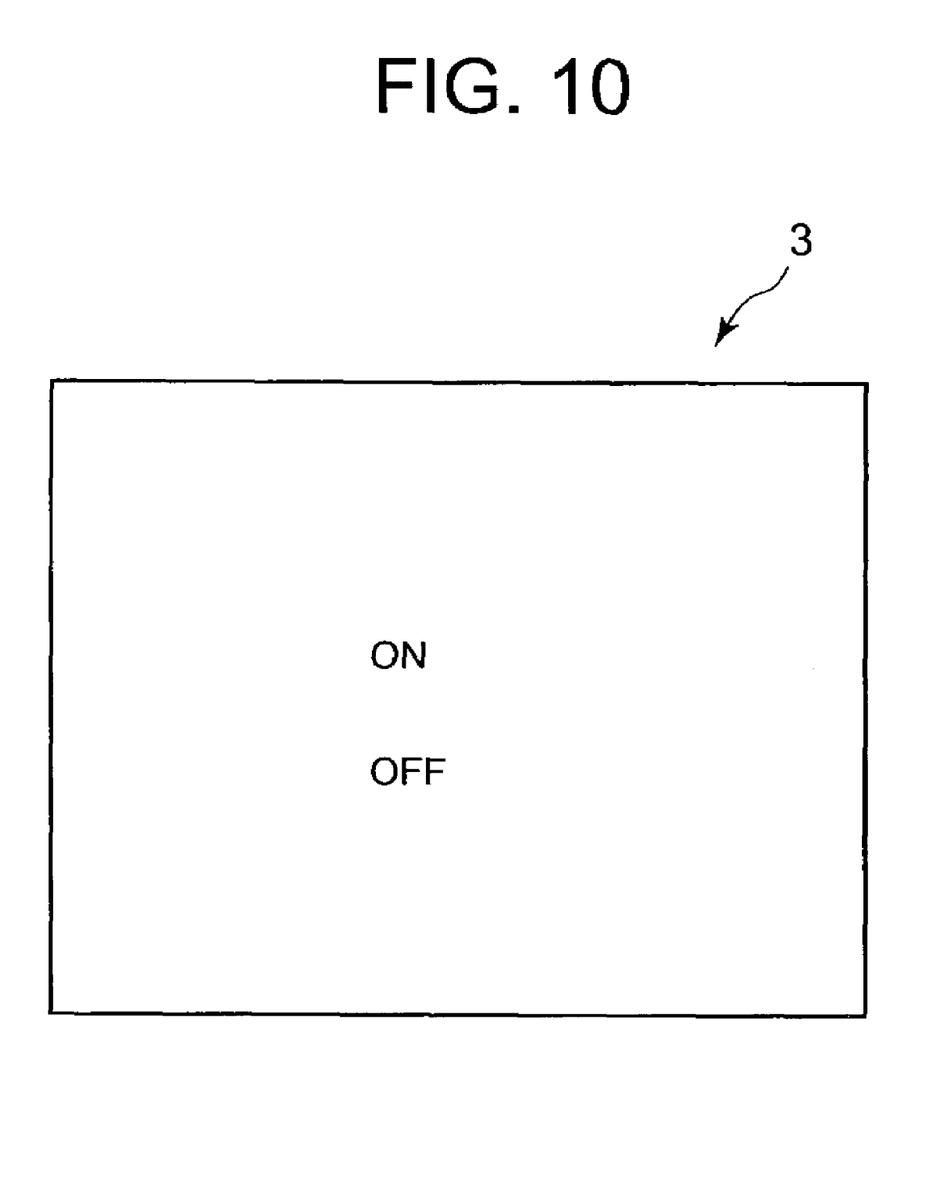
FIG. 10 is a view illustrating an example of an indication displayed on a screen in a processes at step S308 and step 311.

The process further advances to step S308, where it is judged if a link to the photographed image is established. In making a judgment at step S308, when the indication of "LINK" is chosen on the menu screen 301, then an indication including "ON" and "OFF" is displayed on the liquid crystal display 3, as shown in FIG. 10. When the indication of "ON" is chosen by key operation, it is determined at step S308 (YES) that the link to the photographed image is to be established, and the establishment of link to the photographed image is stored on RAM 17 at step S310. The above photographed image is the image that has been photographed in the album mode, and stored on the image storage medium 14 at step S204. When the indication of "OFF" is chosen by key operation, it is determined at step S308 (NO) to choose to establish the link to a reduced size image, and a process for establishing the link to the reduced size image for HTML file is performed at step S309.

Figure 11:
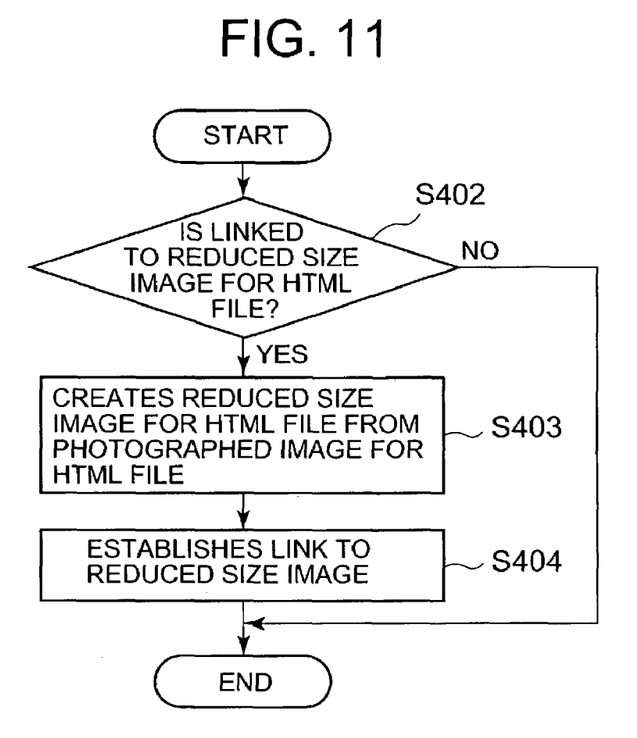
FIG. 11 is a flow chart showing details of a process for creating a shrink image for HTML file at step S309.
Figure 12:
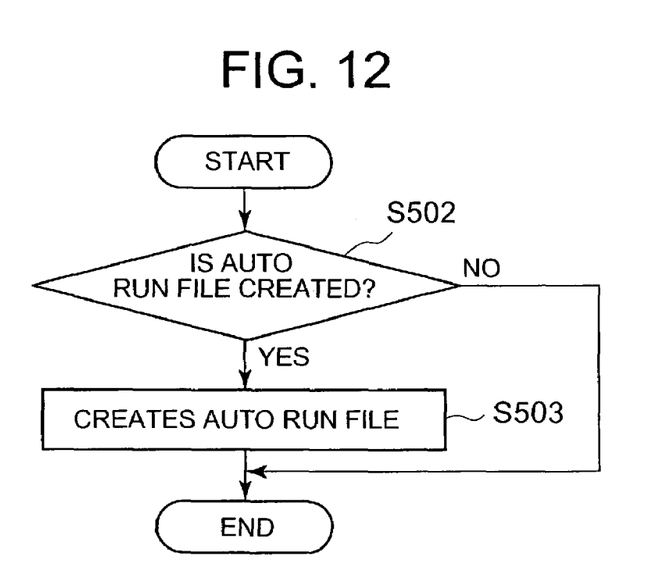
FIG. 12 is a flow chart showing details of a process for creating an auto-run file at step S312.

The process for establishing link to the reduced size image for HTML file at step S309 is performed in accordance with the flow chart of FIG. 11. At step S402, it is judged if the link to the reduced size image for HTML file has been established. As described above, since the indication of "OFF" has been chosen and the link to the reduced size image for HTML file has been established, a reduced size image for HTML file is created from the photographed image which is to be included in the HTML file, and the created reduced size image is stored on the image storage medium 14 at step S403. Establishment of link to the reduced size image is written on RAM 17 at step S404.

Referring now to the flowchart of FIG. 5, it is judged at step S311 if an auto run file is created. The auto run file is a program file that automatically runs for setting HTML file to start up, when the camera is connected to a personal computer.

In making judgment at step S311, when the indication of "AUTO RUN FILE" is chosen on the menu screen 301, the indications of "ON" and "OFF" are displayed on the liquid crystal display 3 as shown in FIG. 10. When the indication of "ON" is chosen by key operation, it is determined to create the auto run file, and a process for creating the auto run file is performed at step S312. The process for creating the auto run file at step S312 is performed in accordance with a flow chart of FIG. 12. At step S502 in the flow chart of FIG. 12, it is judged if the auto run file is created. Since the indication of "ON" is chosen to create the auto run file, the auto run file is created and stored on the image storage medium 14 at step S503.

At step S313 in the flow chart of FIG. 5, it is judged if operation for ceasing the setting operation has been performed, and the processes at step S301 through step S313 are repeatedly performed until it is determined at step S313 that the operation for ceasing the setting operation has been performed. When it is determined at step S313 that the operation for ceasing the setting operation has been performed, the setting process of FIG. 5 finishes.

When various conditions for creating HTML file have been set, the process advances from step S206 to step S207, where it is judged if the HTML file is immediately created.

When it is determined at step S207 that an instruction to immediately create the HTML file has been entered by operation of menu keys, HTML files to include only the images that have been photographed in the album mode and stored on the image storage medium 14 at step S204 or HTML files to include only the images that have been photographed in the album mode and chosen at step 302 are immediately created in accordance with the conditions set at step S206 (FIGS. 5, 11, 12), and the created HTLM files are stored on the image storage medium 14 at step S208.

Meanwhile, when it is determined at step S207 that no instruction to immediately create the HTML file has been entered, HTML files to include only the images that have been photographed in the album mode and stored on the image storage medium 14 at step S204 or HTML files to include only the images that have been photographed in the album mode and chosen at step 302 are created, at the time of power-off, in accordance with the conditions set at step S206 (FIGS. 5, 11, 12), and the created HTLM files are stored on the image storage medium 14 at step S209.

As set forth above, the present embodiment allows the user to create HTLM file to the user's intention regarding the image selection, layout, background color, link and auto run file. Since the image to be linked with HTML file is the reduced size image for HTML file, a load of processing data and the time required before displaying the HTML file on the display screen are reduced or shortened. As the reduced size image is created for HTML file separately, the image is displayed sharp and clearly, giving satisfaction to viewers.

In the first and second embodiments, the album mode is prepared as one of the photograph modes such as "normal mode", "scenery mode", "portrait mode", "macro mode", "panorama mode", and "album mode", but this album mode may be prepared independently of the photograph mode.

In other words, the album mode may be set after one of the photograph modes has been chosen. For instant, when the scenery mode is chosen, then it is judged if the album mode is set (at step S102 or step S202), and thereafter the processes are performed in accordance with the flow charts of FIG. 3 and FIG. 4. As describe above, it may be judged in each of the photograph modes, if the album mode is set.

The album mode may be set at first before one of the photograph modes is chosen. That is, the photograph mode may be chosen (at step S101 or step S201), after it is judged if the album mode has been set (at step S102 or step S202). Thereafter, the same processes as those shown in FIG. 3 or FIG. 4 are performed.

As described above, since the album mode is set in setting the photograph mode is set, HTML file may be created only based on the images that the user desires to link the HTLM files to.

Third Embodiment

Figure 13:
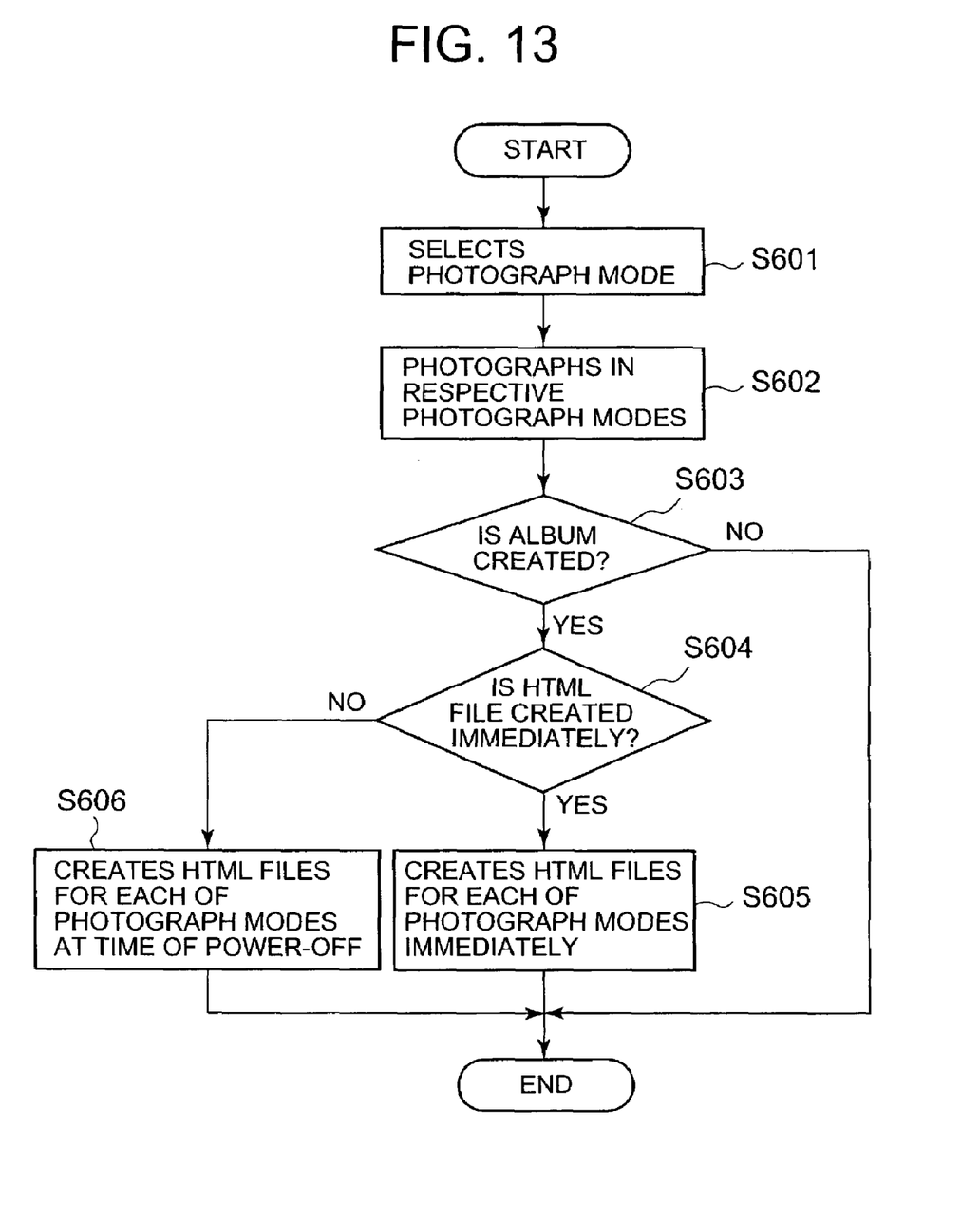
FIG. 13 is a flow chart of processes performed in a third embodiment of the present invention.

FIG. 13 is a flow chart of processes performed in the third embodiment of the invention. At step S601, the process for choosing the photograph mode is performed. In the process for choosing the photograph mode, the photograph-mode menu including indications such as "NORMAL MODE", "SCENERY MODE", "PORTRAIT MODE", "MACRO MODE", and "PANORAMA MODE" is displayed on the liquid crystal display 3 by operation of the menu keys 7. When either of photograph modes is chosen on the liquid crystal display 3 by operation of the cross cursor key 5, the chosen photograph mode is set to the camera 1. In the chosen photograph mode a picture of a subject is taken in response to operation of the shutter key 6 at step S602, whereby an image signal of the subject is generated. The image signal is processed and compressed in accordance with the photograph mode set at step S601, whereby an image file in JPEG format is created and stored on the image storage medium 14. One image file of the image that is photographed in the photograph mode is stored on the image storage medium 14 every operation of the shutter 6.

When the user operates the menu keys 7 at step S603 (YES) to enter an instruction to create an album file after taking several pictures in a certain photograph mode or in another photograph mode, the process advances to step S604, where it is judged if HTML file is immediately created.

When the user operates the menu keys 7 to instruct to immediately create HTML file at step S604 (YES), HTML files for images that have been photographed in respective photograph modes and stored on the image storage medium 14 at step S602 are immediately created for each of the photograph modes and are stored on the image storage medium 14 at step S605. When the instruction to immediately create HTML file is not entered at step S604 (NO), HTML files for images that have been photographed in respective photograph modes and stored on the image storage medium 14 at step S602 are created at the time of power-off for each of the photograph modes and are stored on the image storage medium 14 at step S606.

In the present embodiment, HTML files only for the images that are photographed in the photograph modes set by the user are created for each of the photograph modes. In other words, HTML files only for the images that have been photographed in the photograph modes that the user desires may be created, whereby the user intention may be reflected to images to be included in HTML file, and an amount of data size in a file is reduced, which allows easy treatment (store and transfer) of the files.

Forth Embodiment

Figure 14:
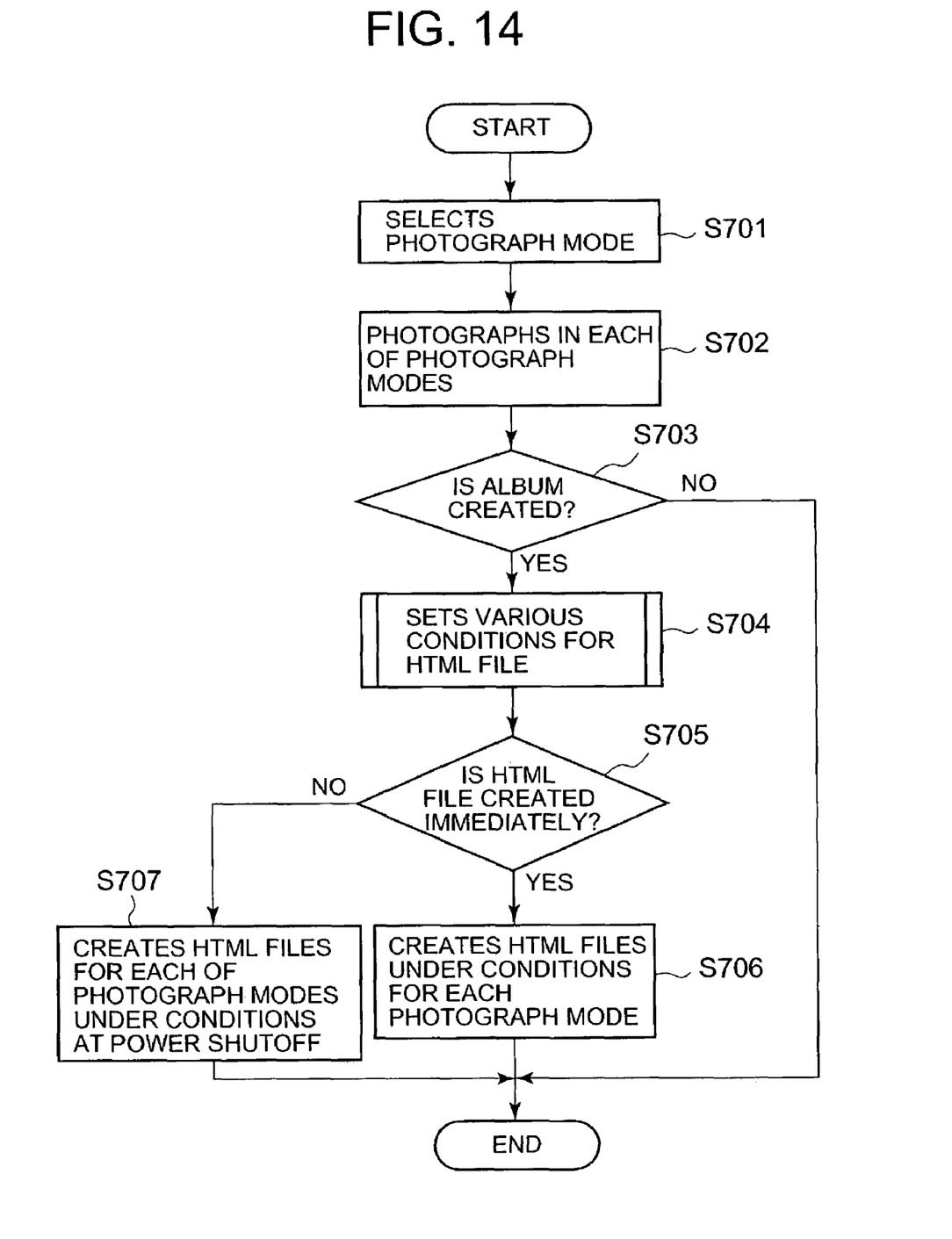
FIG. 14 is a flow chart of processes performed in a forth embodiment of the present invention.

FIG. 14 is a flow chart of processes performed in the forth embodiment of the invention. At step S701, the process for choosing the photograph mode is performed. In the process for choosing the photograph mode, the photograph-mode menu including indications such as "NORMAL MODE", "SCENERY MODE", "PORTRAIT MODE", "MACRO MODE", and "PANORAMA MODE" is displayed on the liquid crystal display 3 by operation of the menu keys 7. When either of photograph modes is chosen on the liquid crystal display 3 by operation of the cross cursor key 5, the chosen photograph mode is set to the camera 1. A picture of a subject is taken in response to operation of the shutter key 6 in the chosen photograph mode at step S702, whereby an image signal of the subject is generated. The image signal is processed and compressed in accordance with the photograph mode set at step S701, whereby an image file in JPEG format is created and stored on the image storage medium 14. One image file of the image that is photographed in the photograph mode is stored on the image storage medium 14 every operation of the shutter 6.

When the user operates the menu keys 7 at step S703 (YES) to enter the instruction to create an album file after taking several pictures in a certain photograph mode or in another photograph mode, the process advances to step S704, where the process for setting conditions for HTML file is performed.

The process for setting conditions for HTML file at step S704 is the same process as that at step S206 in the flow chart of FIG. 4. More specifically, the process of step S704 is performed in accordance with the flowchart of FIG. 5, and the process of step S309 is performed in accordance with the flow chart of FIG. 11, and further the process of step S312 is performed in accordance with the above mentioned flow chart of FIG. 12.

When the process for setting conditions for HTML file has been performed at step S704, it is judged at step S705 if HTML file is immediately created. When an instruction to immediately create HTML file is given by the user's menu-key operation at step S705 (YES), HTML files for the images that have been photographed in each photograph mode at step S702 and stored in the image storage medium 14 are created for each of the photograph modes in accordance with the conditions sete at step S704 and stored in the image storage medium 14 at step S706. When the instruction to immediately create HTML file is not given at step S705 (NO), HTML files for the images that have been photographed in respective photograph modes at step S702 and stored in the image storage medium 14 are created at the time of power-off for each of the photograph modes in accordance with the conditions set at step S704 and stored in the image storage medium 14 at step S707.

As set forth above, the present embodiment allows the user to create HTLM file to the user's intention regarding the image selection, layout, background color, link and auto run file. Since the image to be linked with HTML file is the reduced size image for HTML file, a load of processing data and the time required before displaying the HTML file on the display screen are reduced or shortened. As the reduced size image is created for HTML file separately, the image is displayed sharp and clearly, giving satisfaction to viewers.

Fifth Embodiment

Figure 15:
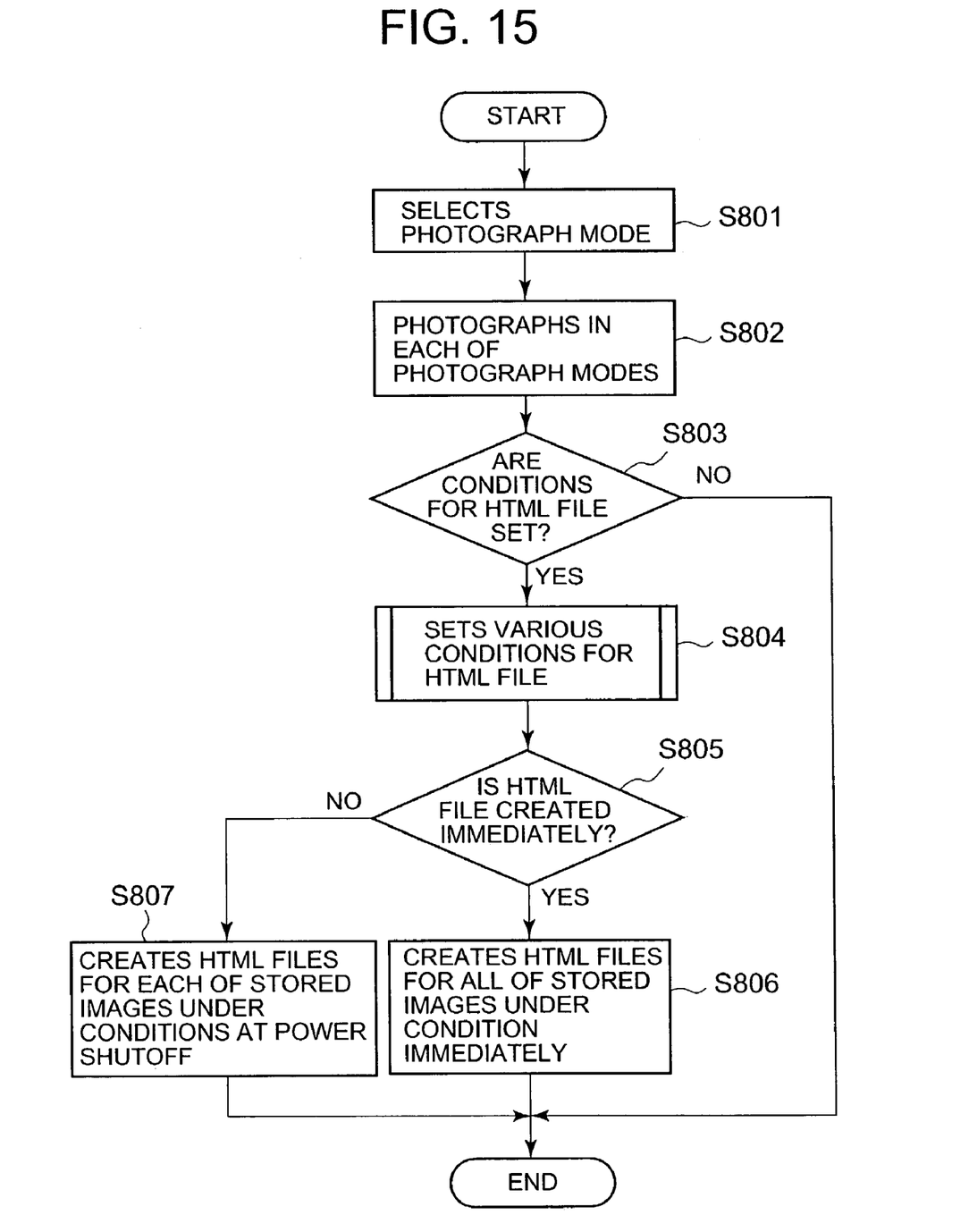
FIG. 15 is a flow chart of processes performed in a fifth embodiment of the present invention.

FIG. 15 is a flow chart of processes performed in the fifth embodiment of the invention. At step S801, the process for choosing the photograph mode is performed. In the process for choosing the photograph mode, the photograph-mode menu including indications such as "NORMAL MODE", "SCENERY MODE", "PORTRAIT MODE", "MACRO MODE", and "PANORAMA MODE" is displayed on the liquid crystal display 3 by operation of the menu keys 7. When either of photograph modes is chosen on the liquid crystal display 3 by operation of the cross cursor key 5, the chosen photograph mode is set to the camera 1. A picture of the subject is taken in response to operation of the shutter key 6 in the chosen photograph mode at step S802, whereby an image signal of the subject is generated. The image signal is processed and compressed in accordance with the photograph mode set at step S801, whereby an image file in JPEG format is created and stored on the image storage medium 14. One image file of the image that is photographed in the photograph mode is stored on the image storage medium 14 every operation of the shutter 6.

When the user operates the menu keys 7 at step S803 (YES) to enter the instruction to create an album file after taking several pictures in a certain photograph mode or in another photograph mode, the process advances to step S804, where a process for setting conditions for HTML file is performed.

The process for setting conditions for HTML file at step S804 is the same process as that at step S206 in the flow chart of FIG. 4. More specifically, the process of step S804 is performed in accordance with the flowchart of FIG. 5, and the process of step S309 is performed in accordance with the flow chart of FIG. 11, and further the process of step S312 is performed in accordance with the above mentioned flow chart of FIG. 12.

When the HTML setting process has been performed at step S804, it is judged at step S805 if HTML file is immediately created. When an instruction to immediately create HTML file is given by the user's menu-key operation at step S705 (YES), HTML files of all the images that have been photographed in each photograph mode and stored in the image storage medium 14 at step S802 are created in accordance with the settings made at step S804 and stored in the image storage medium 14 at step S806. When the instruction to immediately create HTML file is not given at step S805 (NO), HTML files of all of the images that have been photographed in each photograph mode at step S802 and stored in the image storage medium 14 are created at the time of power-off in accordance with the settings made at step S804 and stored in the image storage medium 14 at step S807.

As set forth above, the present embodiment allows the user to create HTLM file to the user's intention regarding the image selection, layout, background color, link and auto run file. Since the image to be linked with HTML file is the reduced size image for HTML file, a load of processing data and the time required before displaying the HTML file on the display screen are reduced or shortened As the reduced size image is created for HTML file separately, the image is displayed sharp and clearly, giving satisfaction to viewers.

In the above mentioned embodiments, cases in which the digital camera 1 is used as the imaging device are explained, but the present invention may be applied to a mobile cellar phone with a camera and to a personal digital assistance with camera. Further modification and variation can be made to the disclosed embodiments without departing from the subject and spirit of the invention as defined in the following claims. Such modification and variations, as included within the scope of these claims, are meant to be considered part of the invention as described.

What is claimed is:

1. An imaging apparatus with a display comprising:
   an imaging section for taking a picture of a subject to generate an image signal of the subject;
   a mode setting section for selectively setting one of a plurality of photograph modes;
   a processing section for processing the image signal generated by the imaging section in accordance with the photograph mode set by the mode setting section to obtain image data;
   a storage section for storing the image data obtained by the processing section;
   a condition setting section which, responsive to an operation by a user, sets conditions for creating an album file from the image data stored in the storage section; and
   a file creating section for creating the album file based on the conditions set by the condition setting section using the image data stored in the storage section, to display the image data in list form on the display; and
   an instruction file creating section for creating an instruction file to instruct a personal computer to automatically start up the created album file to automatically display the image data in the list form on a display of the personal computer when the imaging apparatus is connected to the personal computer, wherein the file creating section creates album files corresponding respectively to the photograph modes from the image data stored in the storage section.

2. The imaging apparatus according to claim 1, wherein the condition setting section sets a layout of the image data in the album file.

3. The imaging apparatus according to claim 1, wherein the condition setting section sets a background color in the album file.

* * * * *

UNITED STATES PATENT AND TRADEMARK OFFICE
CERTIFICATE OF CORRECTION

PATENT NO.       : 7,483,060 B2                                    Page 1 of 1
APPLICATION NO.  : 10/460977
DATED            : January 27, 2009
INVENTOR(S)      : Miyata It is certified that error appears in the above-identified patent and that said Letters Patent is hereby corrected as shown below:

On the Title page:

Item (57) Abstract;

Replace the Abstract with the following Abstract:

An imaging apparatus is provided which includes a display, an imaging section for taking a picture of a subject to generate an image signal of the subject, and a mode setting section for selectively setting a predetermined photograph mode from among plural photograph modes which are assigned with respective processing functions. A processing section processes the image signal generated by the imaging section in accordance with the photograph mode set by the mode setting section to obtain image data, and a storage section stores the image data obtained by the processing section. A file creating section creates an album file, based on plural pieces of image data stored in the storage section, to display on the display images of the plural pieces of image data in list form, wherein the file creating section classifies the plural pieces of image data stored in the storage section into the photograph modes, according to which the plural pieces of image data are respectively processed, and creates plural album files based on the classified image data.

Signed and Sealed this

Seventeenth Day of November, 2009

David J. Kappos
*Director of the United States Patent and Trademark Office*